United States Patent [19]

Marlett

[11] Patent Number: 4,927,616

[45] Date of Patent: * May 22, 1990

[54] PREPARATION OF SILANE AND AMINE ALANES

[75] Inventor: Everett M. Marlett, Baton Rouge, La.

[73] Assignee: Ethyl Corporation, Richmond, Va.

[*] Notice: The portion of the term of this patent subsequent to Jul. 12, 2005 has been disclaimed.

[21] Appl. No.: 416,042

[22] Filed: Oct. 2, 1989

[51] Int. Cl.$^5$ .................... C01B 33/04; C01B 9/08; C07F 5/06
[52] U.S. Cl. .................... 423/347; 423/489; 423/499; 556/176
[58] Field of Search ................ 556/176; 423/489, 499, 423/347

[56] References Cited

U.S. PATENT DOCUMENTS

| | | | |
|---|---|---|---|
| 2,680,059 | 6/1954 | Bragdon | 23/14 |
| 3,541,125 | 11/1970 | Sims | 260/448 |
| 3,642,853 | 2/1972 | Murib et al. | 260/448 |
| 4,006,095 | 2/1977 | Hoffman et al. | 252/188 |
| 4,474,743 | 10/1984 | Marlett | 423/347 |
| 4,629,801 | 12/1986 | Soula et al. | 556/466 |
| 4,632,816 | 12/1986 | Marlett | 423/347 |
| 4,665,207 | 5/1987 | Marlett | 556/176 |
| 4,748,260 | 5/1988 | Marlett | 556/176 |
| 4,757,154 | 7/1988 | Marlett et al. | 556/176 |
| 4,778,668 | 10/1988 | Marlett et al. | 423/347 |

FOREIGN PATENT DOCUMENTS 823496 11/1959 United Kingdom .
851962 10/1960 United Kingdom .

OTHER PUBLICATIONS

Burg, "Trimethylamine Adducts of the Chlorosilanes," *J. Am. Chem. Soc.*, 1954, 76, 2674–2675.
Ring et al., "A New 1:1 Adduct of Trimethylamine and Trichlorosilane, Trimethylammonium Trichlorosilyl," *J. Am. Chem. Soc.*, 1971, 93, 265–267.
Bernstein, "On the Mechanism of Interaction between Tertiary Amines and Trichlorosilane," *J. Am. Chem. Soc.* 1970, 92, 699–700.
Benkeser et al., "Evidence for the Existence of the Trichlorosilyl Anion," *J. Am. Chem. Soc.* 1970, 92, 697–698.
Benkeser, "The Chemistry of Trichlorosilane-Tertiary Amine Combinations," *Acc. Chem. Res.*, 1971, 4, 94–100.
*Chemical Abstracts* 1983, 98, 200736e.

Primary Examiner—John Doll
Assistant Examiner—Lori F. Cuomo

[57] ABSTRACT

A process is provided wherein tertiary ammonium trichlorosilyl, a complexing tertiary amine, and an alkali metal aluminum tetrahydride are reacted together in molar proportion of about 1:2:3, such that silane and tertiary amine alane are produced. Tertiary ammonium trichlorosilyl may be pre-formed or formed in situ by the reaction of trichlorosilane and tertiary amine. Yields are dramatically higher when the process is conducted in the presence of a tris(polyalkoxyalkyl)amine phase transfer catalyst.

A sequential process is also provided for the preparation of silane and aluminum trifluoride. In the first part of this sequence, silane and tertiary amine alane are produced as described above. In the second part of the sequence, silicon tetrafluoride is reacted with the amine alane, producing additional silane and aluminum trifluoride.

43 Claims, No Drawings

PREPARATION OF SILANE AND AMINE ALANES

TECHNICAL FIELD

This invention relates to the production of tertiary amine alanes, and also relates to the production of silane.

BACKGROUND

Silane is important in the production of electronic equipment and devices. It is an intermediate used to prepare polysilicon, which is used to prepare monocrystalline silicon for use in semiconductor devices.

Amine alanes, complexes of tertiary amines with $AlH_3$, are used in various reduction processes, in the preparation of aluminum, and also in the production of silane.

The production of amine alanes has been accomplished by several methods. These are discussed in Marlett, et al., U.S. Pat. No. 4,757,154 (issued July 12, 1988) and in references cited therein, and in Marlett, U.S. Pat. No. 4,474,743 (issued Oct. 2, 1984) and in references cited therein.

The reaction of tetrachlorosilane (silicon tetrachloride) with alkali metal aluminum hydride and tertiary amine to produce silane and amine alane is disclosed in Marlett, U.S. Pat. No. 4,757,154.

The behavior of trichlorosilane with tertiary amines has been addressed by several references. Burg, "Trimethylamine Adducts of the Chlorosilanes," *J. Am. Chem. Soc.*, 1954, 76, 2674–2675, gives evidence for adduct formation between all mixed chlorosilanes and trimethylamine. There was no evidence for a trimethylamine adduct with $SiH_4$, and the adduct with $SiCl_4$ decomposed above $-54°$ C. Burg also refers to the catalytic effect of trimethylamine on the disproportionation of trichlorosilane.

Ring, et al., "A New 1:1 Adduct of Trimethylamine and Trichlorosilane, Trimethylammonium Trichlorosilyl," *J. Am. Chem. Soc.*, 1971, 93, 265–267, confirm Burg's observations on the trimethylamine-trichlorosilane adduct and present evidence of a new compound, which they characterize as the trimethylammonium salt of the trichlorosilyl anion. Decomposition of their compound with HCl in propyl ether produced $H_2SiCl_2$ and $SiCl_4$ as well as $HSiCl_3$.

Benkeser, "The Chemistry of Trichlorosilane-Tertiary Amine Combinations," *Acc. Chem. Res.*, 1971, 4, 94–100, cites a number of different reports from the literature describing amine complexes with silicon compounds of the general formula $SiH_{4-n}X_n$. He discusses a variety of different experimental evidence for the existence of the trichlorosilyl anion when trichlorosilane is in the presence of various tertiary amines. In this connection, Benkeser also cites Bernstein, "On the Mechanism of Interaction between Tertiary Amines and Trichlorosilane," *J. Am. Chem. Soc.* 1970, 92, 699–700, and Benkeser et al., "Evidence for the Existence of the Trichlorosilyl Anion," *J. Am. Chem. Soc.* 1970, 92, 697–698, which discuss trichlorosilane in the presence of tri-n-butylamine and tri-n-propylamine, respectively, forming tri-n-butylammonium trichlorosilyl and tri-n-propylammonium trichlorosilyl, respectively. A number of reactions of $SiCVl_3^-$ can be explained as nucleophilic displacements by $SiCl_3^-$ (p. 97, column 1, near bottom of page, and elsewhere in the reference).

In spite of the apparent stability of the trichlorosilyl anion in combination with tertiary ammonium cation and its penchant for reacting as a unit, it has now been discovered that the reaction of tertiary ammonium trichlorosilyl, i.e., the charge-separated complex between trichlorosilane and a tertiary amine, with alkali metal aluminum tetrahydride in the presence of additional tertiary amine to produce silane and amine alane can be made to occur. Surprisingly, this process is capable of good yields even though the complex has very poor solubility in some solvents used as liquid reaction media.

THE INVENTION

In the process of this invention silane and a tertiary amine alane are produced by reacting (a) tertiary ammonium trichlorosilyl, (b) a complexing tertiary amine, and (c) an alkali metal aluminum tetrahydride. The tertiary ammonium trichlorosilyl complex, i.e., the trichlorosilane-tertiary amine adduct, may be pre-formed or it may be formed in situ. The process of this invention may also be carried out in two stages, in the first of which alkali metal aluminum tetrahydride and a mixed chlorosilane are reacted to produce silane and a residual mixture, and in the second of which tertiary amine is reacted with the residual mixture to produce tertiary amine alane and alkali metal halide. This invention also comprises a sequential process to produce additional silane and aluminum trifluoride. In the first part of this sequence, silane and tertiary amine alane are produced as described above, either in one stage or in two. In the second part of the sequence, silicon tetrafluoride is reacted with the amine alane, producing additional silane and aluminum trifluoride.

In one embodiment of this invention, the tertiary ammonium trichlorosilyl complex is pre-formed by reacting in a liquid reaction medium about one mole of tertiary amine per mole of trichlorosilane, after which about two additional moles of tertiary amine and about three moles of alkali metal aluminum hydride are further reacted with the complex so formed, such that silane and tertiary amine alane are produced. The liquid medium in which the reaction is conducted is one or a mixture of hydrocarbons, ethers, or excess tertiary amine.

In another embodiment of this invention, the tertiary ammonium trichlorosilyl complex is formed in situ. In this embodiment an alkali metal aluminum tetrahydride, a mixed chlorosilane, $SiH_{4-n}Cl_n$, and a complexing tertiary amine are reacted together in a liquid reaction medium in a molar proportion of about n:1:n, such that silane and tertiary amine alane are produced. The mixed chlorosilane has the formula $SiH_{4-n}Cl_n$, where n is 1, 2, or 3. Chlorosilanes are known to disproportionate in the presence of tertiary amine, as noted in Burg (vide supra), and thus the existence of trichlorosilane and the amine adduct thereof is expected in the presence of tertiary amine and other mixed chlorosilanes. The liquid medium in which the process is conducted is one or a mixture of hydrocarbons, ethers, or excess tertiary amine. In a preferred embodiment the liquid reaction medium is one which will at least slightly solubilize the alkali metal aluminum tetrahydride, for example, an ether.

In a highly preferred embodiment of this invention, the reactants, (a) an alkali metal aluminum tetrahydride, (b) a mixed chlorosilane, $SiH_{4-n}Cl_n$, where n=1, 2, or 3, and (c) a complexing tertiary amine, are reacted together in a liquid reaction medium in a molar proportion of about n:1:n in the presence of a tris(polyalkoxyalkyl)amine phase transfer catalyst, such that silane and tertiary amine alane are produced.

In another embodiment of this invention the reaction is conducted in two stages. In the first stage, alkali metal aluminum tetrahydride and a mixed chlorosilane, $SiH_{4-n}Cl_n$, where n is 1, 2, or 3, are reacted in a liquid reaction medium in a molar proportion of from about (n/4):1 to about n:1 such that silane and a residual mixture are produced. Stage 2 comprises contacting the residual mixture, tertiary amine, and additional alkali metal aluminum tetrahydride as needed to give an overall molar proportion for both stages of about n moles of amine and about n moles of alkali metal aluminum tetrahydride per mole of mixed chlorosilane, such that tertiary amine alane and an alkali metal halide coproduct are produced. In a preferred embodiment the liquid reaction medium of the first stage of the process is one which will at least slightly solubilize the alkali metal aluminum tetrahydride, for example, an ether. In another preferred embodiment, the first stage of the process of this invention is conducted in a solvent which is predominantly ether and the second stage is conducted in a solvent which is predominantly hydrocarbon. In another preferred embodiment, the solvent of the first stage is at least partially stripped from the reaction mixture before adding the reactants and the solvent of the second stage.

In another embodiment of this invention the amine alane product is further reacted with silicon tetrafluoride to produce additional silane and aluminum trifluoride. In this embodiment a sequential process is conducted wherein in the first part of the sequence silane and tertiary amine alane are produced according to any of the embodiments disclosed above. In the second part of the sequence silicon tetrafluoride is reacted with the amine alane in the reaction mixture such that silane and aluminum trifluoride are produced. The second part of the sequence illustrates the process of U.S. Pat. No. 4,474,743, cited above, which was issued in the name of the inventor of this invention and has a common assignee. All disclosure of that patent is incorporated by reference as if fully set forth herein.

In the process of this invention, the main source of the hydrogen for the silane produced and the source of the aluminum and hydrogen for the amine alane produced is an alkali metal aluminum tetrahydride. Any available such compound can be used. Lithium aluminum tetrahydride ($LiAlH_4$) and sodium aluminum tetrahydride ($NaAlH_4$) are preferred because potassium aluminum tetrahydride ($KAlH_4$) and higher analogs are not readily available commercially at this time. The $NaAlH_4$ is more preferred because it is the cheaper compound.

The amine used as reactant in this invention can be any tertiary amine which produces an amine alane in reaction with the alkali metal aluminum hydride, or any mixture of such amines. The amine alane product is a complex of the tertiary amine with aluminum hydride, and therefore suitable amines are referred to herein as "complexing tertiary amines". Such suitable amines can be alkyl, cycloalkyl, alkenyl, aryl, and aralkyl amines, including monoamines, diamines, and polyamines. Examples of such amines are: N,N-diphenylmethylamine, phenylmethylethylamine, tricyclohexylamine, N,N,N',N'-tetramethylethylenediamine, quinuclidine (1-azabicyclo[2.2.2]octane), N,N,N',N'-tetramethyldiaminomethane, N-methylpyrrolidine, and the like.

Preferred amines are aliphatic tertiary amines, such as tri-n-butylamine, tri-sec-butylamine, N,N-dibutylpentylamine, n-butyl-n-octyl-sec-butylamine, tripentylamine, trihexylamine, trihexenylamine, trioctadecylamine, N,N-didecenylpentylamine, tridecenylamine, and the like, as well as mixtures thereof. Most preferred are lower alkyl amines such as trimethylamine, triethylamine, triisopropylamine, N,N-dimethylethylamine, N,N-diethylmethylamine, N,N-dimethylpropylamine, and the like. Most highly preferred is triethylamine.

The preferred source of silicon for the silane produced is trichlorosilane, $SiHCl_3$. Trichlorosilane is a readily available, relatively inexpensive material. Depending on the current state in commerce of the various industrial processes which use and produce various chlorosilanes, it may be more readily available or more inexpensive than silicon tetrachloride (tetrachlorosilane). Another advantage of trichlorosilane, as well as other mixed chlorosilanes, is that it already bears some of the hydrogen of the product silane, thus significantly reducing the amount of other reactants required for the reaction. It is reported as discussed above that the disproportionation of mixed chlorosilanes is enhanced by tertiary amine. The other mixed chlorosilanes, $SiH_2Cl_2$ and $SiH_3Cl$, are therefore expected also to disproportionate to form tertiary ammonium trichlorosilyl in the presence of a tertiary amine, and can therefore also be used in the process of this invention. The other disproportionation product(s) will easily react with alkali metal aluminum tetrahydride in the presence of tertiary amine to produce silane and tertiary amine alane. Other (higher atomic number) halosilanes analogous to these three materials can also be used in the process of this invention.. The use of any of these materials is considered an embodiment of this invention. In the second part of the sequential reaction leading to the production of silane and aluminum trifluoride, the preferred source of silicon is silicon tetrafluoride, because the product $AlF_3$ is preferred over $AlCl_3$.

As discussed above, trichlorosilane forms an insoluble compound with certain tertiary amines; with others (for example, tri-n-propylamine or tri-n-butylamine, as discussed in the last paragraph of column 2, page 94 of the Benkeser reference cited above) an adduct is formed which may be soluble in some solvents. Applicant has found that yields of the products for some embodiments of this invention are relatively low, and that this low yield characterizes the reaction whether a precipitate is formed or not. (See Example 1 below, where triethylamine is used as a reactant and a precipitate is formed, and Comparative Examples B below, where tri-n-butylamine is used as a reactant and no precipitate is formed.) In contrast, yields are much higher when silicon tetrachloride, a tertiary amine, and an alkali metal aluminum tetrahydride are reacted, as disclosed in U.S. Pat. No. 4,756,154.

While this invention is not limited by any theoretical consideration, it has been discovered that the yields of the process of this invention can be dramatically increased by conducting the process in a liquid medium in which the alkali metal aluminum tetrahydride is at least slightly solubilized, for example, in an ether. If the process of this invention is carried out in two stages, the yields are dramatically increased if the first stage is conducted in a liquid medium in which the alkali metal aluminum tetrahydride is at least slightly solubilized. In the second stage, the remaining reactant or reactants can be added in a hydrocarbon medium, thus effectively providing an ether- hydrocarbon mixture as the medium for the second stage of the reaction. Alternatively, the ether medium of the first stage can be removed or partially removed by stripping before the addition in a hydrocarbon medium of the reactants of the second stage, thus effectively providing a hydrocarbon medium for the second stage.

Most efficacious in the process of this invention, however, is the use of an appropriate phase transfer catalyst, i.e., one which at least slightly solubilizes the alkali metal aluminum tetrahydride. The quaternary ammonium salt type is not effective in increasing yields, as can be seen from comparative Examples C, possibly because the molecular structure of the catalyst is too similar to one of the reactants in question, the tertiary amine. It has been discovered that a tris(polyalkoxyalkyl)amine is especially effective in maintaining high yields in hydrocarbon solvents in the process of this invention. Most highly preferred is tris[2-(2-methoxyethoxy)ethyl]amine, known as TDA-1. This class of phase transfer catalyst is capable of complexing alkali and alkaline earth metals. Use of such a catalyst, therefore, at least slightly solubilizes the alkali metal aluminum tetrahydride, and thus enables the use of ethers to be avoided. Elimination of the ether has significant advantages. It eliminates potential fire and explosion hazards that can exist with mixtures of sodium aluminum tetrahydride and ether in the event that safe reaction temperatures are inadvertently exceeded. Also, ethers can be cleaved under the reaction conditions employed, and elimination of the ether removes this undesirable process complication.

The process of the invention is most advantageously conducted using molar proportions of reactants which are about those of the equations discussed below. This invention is not limited by any theoretical considerations whatsoever. The formation of the tertiary ammonium trichlorosilyl chargeseparated complex and its reaction to produce amine alane and silane have the stoichiometries of equations (1) and (2); equation (3), which is the sum of equations (1) and (2), shows the stoichiometry of the overall process to produce amine alane and silane. In these equations, M represents an alkali metal and $NR_3$ represents a complexing tertiary amine, and trichlorosilane is taken as representative of any mixed chlorosilane in the overall process.

$$SiHCl_3 + NR_3 \rightarrow [R_3NH^+SiCl_3^-] \quad (1)$$

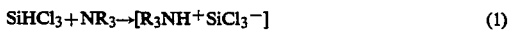

(2)

(3)

For embodiments of this invention wherein the trichlorosilane-tertiary amine adduct, i.e., the tertiary ammonium trichlorosilyl complex, is pre-formed or for embodiments wherein it is formed in situ, the most preferred molar proportion $SiHCl_3: NR_3$ of reactants for the reaction represented by equation (1) is from about 1:1 to about 1:3, with up to about 2 additional moles of tertiary amine added if necessary to give an overall molar proportion of about 1:3 for the overall reaction represented by equation (3). In the silane-forming reaction of this embodiment, represented by equation (2), the most preferred proportion $NAlH_4:SiHCl_3$ is about 3:1. Accordingly, with trichlorosilane as reactant, the most preferred molar proportion of reactants $MAlH_4:SiHCl_3:NR_3$ is about 3:1:3. In the general case, with $SiH_{4-n}Cl_n$ as reactant, the most preferred molar proportion of reactants $MAlH_4:SiH_{4-n}Cl_n:NR_3$ is about n:1:n. It is, of course, not necessary to use these exact ratios, as anyone skilled in the art would know. A slight excess of one of the reactants will aid in driving the reaction to completion; for example, about a 5-10% excess of $MAlH_4$ can be used in this manner. As discussed above, an excess of the amine, if liquid, may be used as the reaction medium. However, in other reaction media the use of a large excess of a reagent serves no purpose and in fact may be uneconomical or may encumber product separation and recovery. Anyone skilled in the art, therefore, would choose to use about the mole ratios discussed above for the overall process according to equation (3), and about those ratios discussed below for the two stage process and for the sequential process with silicon tetrafluoride.

If the process of this invention is conducted in two stages with trichlorosilane as reactant, the two stages obey the stoichiometry of equations (4) and (5), with the overall process being represented by the sum of these two equations which is in fact equation (3) above.

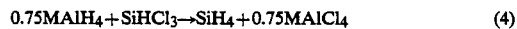

(4)

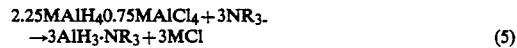

(5)

In the general case, with $SiH_{4-n}Cl_n$ as reactant instead of $SiHCl_3$, the coefficients 0.75 (or ¾) in equations (4) and (5) become n/4, the coefficient 2.25 (or 3¾) in equation (3) becomes n−n/4, and the coefficients 3 in equation (5) become n in the analogous equations. Again, while the invention is not limited by any theoretical consideration, the most preferred molar proportion of reactants is about that proportion illustrated in the equations. In the two-stage process, the entire quantity of the alkali metal aluminum tetrahydride may be added in the first stage, the excess reagent for the first stage forming part of the reactant mixture to which the amine is added in the second stage, or, alternatively, as little as the minimum stoichiometric proportion of alkali metal aluminum tetrahydride may be added in the first stage, the remainder being added in the second stage along with the tertiary amine.

In the case of the sequential process to produce additional silane and aluminum trifluoride, the first part of the sequence has the stoichiometry given above for the one-stage or the two-stage case. In the second part of the sequence, the stoichiometry follows equation (6).

(6)

Again, the invention is not limited by any theoretical consideration, but the most preferred molar proportion of reactant is about that proportion illustrated in the equation.

As mentioned above, an excess of the amine reactant may be used, if liquid, to impart the well-known advantages of a liquid reaction medium. Among these are: to aid in transfer of reactants, to facilitate contact among the reactants, to aid in separation of products from the reactant mixture, and so forth. Any of the amines suitable as the reactant in the process of this invention may also be used in excess quantity as a liquid reaction medium. For most purposes inert liquid reaction media that are relatively inexpensive are preferred. Also to be considered are solubility of the reactants, complexing ability, ease of decomplexation, resistance to cleavage, boiling point, level of toxicity, and other factors, including safety and handling factors. Therefore, ethers are preferred over amines and hydrocarbons are more preferred.

Various ethers may be used to comprise the liquid reaction medium, either singly or in admixture, for example, diethyl ether, dipropyl ether, di-isopropyl ether, ethyl propyl ether, methyl propyl ether, dibutyl ether, ethyl butyl ether, polyethers such as glyme (dimethoxyethane, or the dimethyl ether of ethylene glycol), diglyme (the dimethyl ether of diethylene glycol), triglyme (the dimethyl ether of triethylene glycol), tetraglyme (the dimethyl ether of tetraethylene glycol), dimethoxypropane, and the like, as well as 1,4-dioxane, 1,3-dioxolane, tetrahydrofuran, 2-methyltetra- hydrofuran, 3-methyltetrahydrofuran, 2,5-dimethyltetrahydrofuran, and similar substances. Polyethers are preferred, particularly dimethoxyethane and diglyme; tetrahydrofuran is most highly preferred.

The ethers described above are most highly preferred in those embodiments of the invention in which a phase transfer catalyst is not used. If the invention is conducted without a phase transfer agent according to the two-stage process, an ether medium is especially preferred for the first stage of the process. For the second stage of the process, an ether medium is preferred, but a hydrocarbon medium is more preferred.

For embodiments of this invention wherein a phase transfer catalyst is employed for the reaction, hydrocarbons are preferred as the reaction medium. For example, alkanes such as pentane, hexane, heptane, octane, nonane, decane, undecane, dodecane, and the like can be used. Aromatic hydrocarbons are particularly preferred, especially mononuclear aromatic hydrocarbons. Among those which can be used, either singly or in admixture, are benzene, toluene, ethylbenzene, propylbenzene, isopropylbenzene, butyl benzenes, xylenes, mesitylene, higher alkyl and dialkyl benzenes such as 1,2-diethylbenzene, 1,3-diethylbenzene, 1,4-diethylbenzene, 1,3-dipropylbenzene, 3-propyltoluene, 4-ethyltoluene, 4-propyltoluene, 4-butyltoluene, trialkylbenzenes, 1-methylnaphthalene, 1,2,3,4-tetrahydronaphthalene, and similar compounds. One convenient solvent is the commercially available mixture of benzene, toluene, and xylene, commonly known as BTX. Mixtures of hydrocarbons predominating in aromatic components but with minor amounts of aliphatic or cycloaliphatic components may also be used. Mixtures of ethers and hydrocarbons may also be used.

When the process of this invention is continued in the sequence which produces silane and and aluminum trifluoride co-product, the liquid reaction medium for the second part of the sequence may be any of the liquids described above for the first part of the sequence. In this connection, tertiary amines do tend to complex to some extent with the aluminum trifluoride and completely with aluminum trichloride co-product formed by reacting an amine alane with $SiF_4$ or $SiCl_4$. Nevertheless as pointed out above, tertiary amines can be successfully employed as "inert" reaction media or reaction diluents, the term "inert" being employed herein to signify that the reaction medium does not interfere with the desired reaction (i.e., the production of silane and aluminum fluoride co-product) even though the medium or diluent may tend to undergo complexation with the aluminum fluoride co-product. Naturally the medium selected should not form complexes with the aluminum fluoride which cannot be readily decomposed to form aluminum trifluoride and the free medium.

The product yields and degree of difficulty to free the amine from the $AlF_3$ may vary somewhat from amine to amine but in general the tertiary amines are usable in the process to form the $AlH_3$ complex and, if liquid under the reaction conditions used, as liquid reaction media as well. When a tertiary amine is employed as the sole liquid inert reaction medium it will ofcourse be present in quantity in excess of that required to complex with the aluminum hydride present in the system. Mixtures of tertiary amines with hydrocarbons (e.g., toluene, xylene, mesitylene, ethylbenzene, etc.) or with ethers (e.g., dimethyl ether, diethyl ether, dioxane, tetrahydrofuran, etc.) are also suitable inert media.

The $AlF_3$ co-product can be readily separated from the complexed amine by heating. Preferably an inert gas such as helium, hydrogen, argon, nitrogen, etc. is swept over the solid co-product while heating to direct the amine to a suitable condensation system, such as a condenser or trap where it may be recovered and, if desired, recycled. When the complexed amine is triethylamine, heating vaporizes the amine very well. At 95° C. the triethylamine complex is not significantly affected; at 200° C., a small fraction of the amine is freed after a short time; at 250° C., more than one-half the amine is eliminated and at 300° C. or higher substantially all the amine is separated from the $AlF_3$ co-product.

Alternatively, the aluminum trifluoride co-product may be heated under reduced pressure whereby the liberated tertiary amine can be separated from the residual aluminum trifluoride product.

If a sweep gas or vacuum (reduced pressure) is not used, amine degradation may occur during heating of the $AlF_3$ co-product.

Other methods may be used to separate the amine from the aluminum trifluoride co-product. For example, use of aqueous HF followed by ethanol extraction, use of concentrated HCl followed by $CHCl_3$ extraction, or use of ethanol containing one equivalent of HBr lowers the complexed amine content in the product.

When $NaAlH_4$ is used to prepare the complexed amine alane, a relatively pure source is desirable especially where trace metals are present. The $NaAlH_4$ is preferably recrystallized if the $NaAlH_4$ is prepared from aluminum containing, e.g., 1900 ppm titanium. Otherwise, autodecomposition of the alane may occur if the crude mixture is heated or allowed to stand for long periods. Crude $NaAlH_4$ can be used successfully if the product solution of $AlH_3 \cdot NR_3$ is filtered from the by-product salts and other impurities.

The reaction mixtures of the invention are often gel-like in appearance, but agitation and filtration of the slurries are relatively easy.

The reaction variables, temperature, pressure, and reaction time are not critical in this invention. In general a skilled practitioner will select a set of variables which affords an acceptable product yield in a reasonable reaction time, without an untoward amount of undesired side reactions. The variables selected will in some way or ways reflect the process ingredients employed. For example, if trimethylamine is used as a reactant, the reaction can be conducted at somewhat elevated pressure to facilitate contacting this amine with the other materials in the reaction mixture. If a starting material -s somewhat temperature sensitive, a low to mild temperature can help diminish decomposition of the sensitive substance. If the reaction kinetics are slow, a longer reaction time can be used to increase reaction yields.

The set of reaction parameters employed can be determined by a skilled practitioner without an undue amount of experimentation using the skill of the art and the teachings within this specification.

The silane-forming reactions of this process can be conducted over a wide range of temperatures. A suitable temperature range is about 0° to about 80° C. and a preferred range is about 5° C. to about 60° C. These reactions can be conducted at atmospheric, subatmospheric or super-atmospheric pressures. In general, atmospheric pressure is suitable when using reactants that are solids or liquids at reaction temperatures. A preferred pressure range is 1 to 100 atmospheres, more preferably 1 to 20 atmospheres. The reaction time is not a truly independent variable but is dependent at least to some extent on the other reaction conditions employed. Generally, each of the silane-forming reactions is conducted in a time of from 0.25 to 24 hours, preferably from about 1 to about 8 hours.

The following examples illustrate the various embodiments of this invention but are not intended to limit the spirit and scope of this invention.

EXAMPLE 1

This example illustrates the use of pre-formed triethylammonium trichlorosilyl in the process of this invention. A solution of 0.42 g (7.5 mmole) of 97% sodium aluminum tetrahydride, $NaAlH_4$, and 8.4 g of dry tetrahydrofuran, THF, was prepared and placed into a 25 mL dispensing funnel. To a 50-mL, 3-neck, round-bottom flask were added 1.37 g (10.0 mmole) of 99% trichlorosilane, $SiHCl_3$; 1.02 g (10.0 mmole) of 99% triethylamine which had been distilled from $LiAlH_4$; and 11.6 g of dry THF. The funnel was attached to the flask and the unit was attached to a gas collection train and swept with $H_2$. The condenser was cooled with dry ice/acetone to about −20° C., and the trap was immersed in liquid nitrogen, $N_2$ at −196° C. A 30° C. waterbath was used to warm the flask. The contents of the funnel were added dropwise to the hydride mixture in the flask at 30° C., with stirring, over a 10-minute period. After another 45 minutes the trap was isolated and evacuated, and the liquid $N_2$ trap was removed, allowing the $SiH_4$ to expand into the calibrated section. The moles of gas produced were calculated from the Ideal Gas Law. A sample of the gas was collected and analyzed by gas chromatography/mass spectrometry (GC/MS). The yield of silane was 26%.

EXAMPLE 2

In this example, triethylammonium trichlorosilyl was formed in situ. In a typical experiment 1.75 g (31.5 mmol) of 97% $NaAlH_4$, 3.1 g (30 mmol) of triethylamine, $Et_3N$, and 15.0 g of dry toluene were placed in a 50-mL, 3-neck, round-bottom flask. To a dispensing funnel were added 1.37 g (10 mmol) of 99% $SiHCl_3$ and 5.0 g of dry toluene. The funnel was attached to the flask and the unit was attached to a gas collection train and swept with $H_2$. The contents of the funnel were added dropwise to the hydride mixture, held at 30° C., with stirring, over a 20-minute period. During the feed period, the solids in the mixture turned yellow, then green, orange or brown, and then reverted to yellow when all feed was in. The silane produced was condensed at −196° C. After another 30 minutes, the trap was isolated and evacuated, and the liquid $N_2$ trap was removed, allowing the $SiH_4$ to expand into the calibrated section. The moles of gas produced were calculated from the Ideal Gas Law. A sample of the gas was collected and analyzed by GC/MS. The residual slurry was filtered, and the filtrate was analyzed for soluble hydride, aluminum, and chloride. The yield of silane was 28% and the yield of amine alane was 78%.

The procedure of this experiment was repeated, except that in the second run the reactor temperature was held at 10.C during the addition period. The silane yield was 26% and the amine alane yield was 72%.

EXAMPLE 3

Because toluene appeared to be participating in the reaction, the solvent was changed to dimethoxyethane (DME), and the procedure of Example 2 was repeated. The color changes were not observed. Silane yields in DME increased to 60–80% in two runs; disilane was also produced in yields up to about 10%.

EXAMPLE 4

The procedure of Example 2 was repeated except that tetrahydrofuran (THF) was used as the solvent. The yield of silane was 94% (disilane was less than 0.3%) and the yield of amine alane was 88%.

EXAMPLE 5

The reaction was carried out in two stages, using different solvents in each stage, followed by addition of $SiF_4$ to the recovered amine alane. In the first stage, 1.75 g (31.5mmol) of $NaAlH_4$ in 10.o g of dry dimethoxyethane were placed in a 50mL, 3-neck round-bottom flask and a solution of 1.37 g (10 mmole) of $SiHCl_3$ in 5.0 g of dimethoxyethane was added from a dispensing funnel. (The method of Example 2 was used for collection of gas.) The silane yield was 87%. In the second stage, 3.1 g (30 mmol) of $Et_3N$ and 20.0 g of dry toluene were added and the resulting mixture was stirred overnight at room temperature. The product slurry was filtered and the filtrate containing amine alane was analyzed and found to contain 0.77 mmol $AlH_3$/gram.

Further reaction was carried out by sparging 10 mmol $SiF_4$ into 18.1 g (14 mmol of $AlH_3$) of the amine alane solution, producing silane in 91% yield. The solid residue was stripped of solvent in vacuo at 160° then calcined at 650° C. X-ray diffraction (XRD) analysis showed only $AlF_3$ and a trace of chiolite ($Na_5Al_3F_{14}$) in these solids. Analysis prior to calcining gave 33.4% Al and 1.15% Na (theory for $AlF_3$ is 32.1% Al). Evidently, some $NaAlH_4$ carried through the reaction in the toluene/DME mixture to produce a small amount of $NaAlF_4$, which was transformed to chiolite during calcining.

COMPARATIVE EXAMPLES - A

The normal mode of addition, $SiHCl_3$ added to a solution of $NaAlH_4$ containing $Et_3N$, was employed in Examples 2-5 above. A number of variations in the mode of reactant addition were tested, as well as changes in mole proportions of reactants.

When inverse addition was tested, the $SiHCl_3$ and $Et_3N$ were mixed with solvent in the reaction flask; a white or yellow slurry of $Et_3NH^+SiCl_3^-$ was formed. The desired solution of $NaAlH_4$ was prepared and transferred to the dispensing funnel. Alternatively, both the Et₃N and the NaAlH₄ were mixed with solvent and transferred to the dispensing funnel, with the SiHCl₃ being mixed with solvent in the reaction flask. The reaction and recovery of SiH4 were carried out in the manner described above. Feeding the NaAlH4 solution containing Et₃N to SiHCl₃ in THF gave a 53-58% yield of silane. Feeding the NaAlH₄ solution in various mole proportions to a slurry of Et₃NH⁺SiCl₃⁻ gave silane in yields of 23% in DME and 26-47% in THF; this addition scheme with the use of another amine, N,N-dimethylethylamine (in 100% excess), gave a silane yield of 46% in THF. Inverse addition of AlH₃·NEt₃ in toluene to the Et₃NH⁺SiCl₃⁻ salt in THF resulted in a 20% yield of silane.

COMPARATIVE EXAMPLES - B

These examples demonstrate that the yields of both products of interest, silane and amine alane, are low when the reaction is conducted in toluene solvent even when the tertiary amine-trichlorosilane adduct is soluble.

Into a 50-mL, 3-neck, round-bottom flask were placed 1.75 g (31 mmole) of 97% NaAlH₄3.70 g (20 mmole) of tri-n-butylamine, and 14.0 g of dry toluene. To a 25-mL dispensing funnel were added 1.35 g (10 mmole) of SiHCl₃, 1.85 g (10 mmole) of tri-n-butylamine, and 5.5 g of dry toluene. A clear homogeneous mixture was apparent in the funnel. The funnel was connected to one neck of the flask and the unit was attached to the gas collection train and swept with H₂. The contents of the funnel were added dropwise to the flask, held at 35° C., over a 20-minute period. The products were analyzed as in Example 2. The yield of silane was 34% and the yield of amine alane was 69% (by H) or 75% (by Al).

A similar experiment was done using tri-n-propylamine. All of the amine (4.38 g, 30 mmole) was placed in the flask. The silane yield was 24% and the amine alane yield was 64% (by H) or 75% (by Al).

EXAMPLE 6

The phase transfer catalyzed reaction of SiHCl₃, NaAlH₄, and Et₃N in toluene was carried out as follows: In a typical experiment 1.67 g (30 mmole) of 97% NaAlH₄, 2.94 g (29 mmole) of Et₃N, 12.0 g of dry toluene and 0.33 g (1 mmole) of tris[2-(2-methoxyethoxy)ethyl]amine (TDA-1) were placed in a 50-mL, 3-neck round-bottom flask. To a dropping funnel were added 1.37 g (10 mmole) of 99% SiHC₃ and 6.0 g of dry toluene. The funnel was attached to the flask, which was connected to the gas collection train, and the system was swept with H₂. The funnel contents were added dropwise over a 10-minute period to the hydride mixture, which was maintained at 30° C. in a controlled temperature water bath. The silane produced was passed through a dry ice-cooled condenser to remove organic vapors and was condensed at −196° C. After another 50 minutes the trap was isolated and evacuated to about 1 torr, and the liquid N₂ bath was removed, allowing the SiH₄ to expand into the calibrated volume. The moles of gas produced were calculated from the Ideal Gas Law. A sample of the gas was collected and analyzed by GC/MS. The silane yield was 88%; a 3% yield of disilane was obtained.

The residue was filtered through a coarse glass frit under N₂, giving 19.6 g of a water-white filtrate. The filter cake was rinsed twice with 10 mL portions of dry toluene and was then vacuum dried at 80C. The dry cake weighed 1.78 g (an off-white powder). Analysis of the filtrate indicated the presence of AlCl₃ and XRD analysis of the filter cake showed NaAlH₄ (major) and NaCl (minor). Therefore, to 16.62 g of the filtrate (containing 8.4 mmole Cl) was added 1.51 g (28 mmole) of 97% NaAlH₄; the mixture was stirred 4 hours at room temperature. The filtrate from this reaction analyzed 3.92 mmole H per grams, 3.41% Al, and <0.01% Cl, indicating reaction was complete. Calculation of triethylamine alane yield showed 85% by percent H and 83% by percent Al, for an average of 84%.

The procedure of this experiment was repeated except that the amount of Et₃N was 2.04 g (20 mmole) and the amount of TDA-1 was 3.3 g (10 mmole). The reaction was completed in about 1 hour and required no second addition of NaAlH₄; the yield of silane was 95% and the yield of amine alane was 92%.

COMPARATIVE EXAMPLES - C

The procedure of Example 6 was repeated using the quaternary ammonium phase transfer catalysts benzyltriethylammonium chloride and octyldecyldimethylammonium chloride (DAMA ®-8,10 Quat). The following table summarizes the results.

| Phase Transfer Catalyst | Mole Ratio Catalyst:Et₃N | Yield % SiH₄ | AlH₃.NR₃ |
|---|---|---|---|
| TDA-1 (Ex. 6) | 1:2 | 95 | 92 |
| TDA-1 (Ex. 6) | 1:29 | 88 | 84 |
| DAMA ® -8,10 Quat | 1:14 | 7 | 45 |
| Et₃(PhCH₂)NCl | 1:15 | 24 | 75 |

What is claimed is:

1. A process which comprises reacting
   a. tertiary ammonium trichlorosilyl,
   b. a complexing tertiary amine, and
   c. an alkali metal aluminum tetrahydride, in molar proportion a:b:c of about 1:2:3, said process being conducted in a liquid reaction medium, such that silane and tertiary amine alane are produced.

2. A process of claim 1 wherein said tertiary ammonium trichlorosilyl is pre-formed.

3. A process of claim 2 wherein said tertiary ammonium trichlorosilyl is pre-formed in a hydrocarbon reaction medium and the reaction is conducted in a hydrocarbon reaction medium.

4. A process of claim 3 conducted in the presence of a phase transfer catalyst.

5. A process of claim 4 wherein said phase transfer catalyst is a tris(polyalkoxyalkyl)amine.

6. A process of claim 5 wherein said phase transfer catalyst is tris[2-(2-methoxyethoxy)ethyl]amine.

7. A process of claim 3 wherein said hydrocarbon is aromatic.

8. A process of claim 7 wherein said hydrocarbon is toluene.

9. A process of claim 2 wherein said tertiary ammonium trichlorosilyl is pre-formed in an ether reaction medium and the reaction is conducted in an ether reaction medium.

10. A process of claim 9 wherein said ether is dimethoxyethane.

11. A process of claim 9 wherein said ether is tetrahydrofuran.

12. A process of claim 2 wherein said tertiary ammonium trichlorosilyl is pre-formed in a tertiary amine reaction medium and the reaction is conducted in a tertiary amine reaction 13. A process of claim 1 wherein said tertiary ammonium trichlorosilyl is formed in situ.

14. A process of claim 13 wherein said tertiary ammonium trichlorosilyl is formed in situ in a hydrocarbon reaction medium and the reaction is conducted in a hydrocarbon reaction medium.

15. A process of claim 14 conducted in the presence of a phase transfer catalyst.

16. A process of claim 15 wherein said phase transfer catalyst is a tris(polyalkoxyalkyl)amine.

17. A process of claim 16 wherein said phase transfer catalyst is tris[2-(2-methoxyethoxy)ethyl]amine.

18. A process of claim 14 wherein said hydrocarbon is aromatic.

19. A process of claim 18 wherein said hydrocarbon is toluene.

20. A process of claim 13 wherein said tertiary ammonium trichlorosilyl is formed in situ in an ether reaction medium and the reaction is conducted in an ether reaction medium.

21. A process of claim 20 wherein said ether is dimethoxyethane.

22. A process of claim 20 wherein said ether is tetrahydrofuran.

23. A process of claim 13 wherein said tertiary ammonium trichlorosilyl is formed in situ in a tertiary amine reaction medium and the reaction is conducted in a tertiary amine reaction medium.

24. A process of claim 1 wherein said alkali metal aluminum tetrahydride is sodium aluminum tetrahydride.

25. A process of claim 1 wherein said amine is triethylamine and said tertiary ammonium trichlorosilyl is triethylammonium trichlorosilyl.

26. A process of claim 1 wherein triethylammonium trichlorosilyl is formed in situ by contacting sodium aluminum tetrahydride, trichlorosilane, and triethylamine in a mole proportion of about 3:1:3.

27. A process conducted in stages,
stage 1 comprising contacting alkali metal aluminum tetrahydride and a silicon compound of the formula $SiH_{4-n}Cl_n$, where n is 1, 2, or 3, and in a molar proportion of from about (n/4):1 to about n:1 in a liquid reaction medium such that silane and a residual mixture are produced, and
stage 2 comprising contacting said residual mixture, tertiary amine, and additional alkali metal aluminum tetrahydride as needed to supply an overall molar proportion of about n moles of amine and about n moles of alkali metal aluminum tetrahydride per mole of said silicon compound in a liquid reaction medium such that tertiary amine alane and an alkali metal halide co-product are produced.

28. A process of claim 27 wherein said alkali metal aluminum tetrahydride is sodium aluminum tetrahydride.

29. A process of claim 27 wherein said silicon compound is trichlorosilane.

30. A process of claim 27 wherein said liquid reaction medium is predominantly tetrahydrofuran.

31. A process of claim 27 wherein the liquid reaction medium of stage 1 is predominantly an ether and the liquid reaction medium of stage 2 is predominantly a hydrocarbon.

32. A process of claim 31 wherein said ether is dimethoxyethane and said hydrocarbon is toluene.

33. A process of claim 27 wherein said amine is triethylamine.

34. A process of claim 27 wherein
stage 1 comprises contacting sodium aluminum hydride and trichlorosilane in a molar proportion of from about (3/4):1 to about 3:1 in a liquid reaction medium which is predominantly dimethoxyethane such that silane and a residual mixture are produced, and
stage 2 comprises contacting said residual mixture, triethylamine, and additional alkali metal aluminum tetrahydride as needed to supply an overall molar proportion of about 3 moles of amine and about 3 moles of alkali metal aluminum tetrahydride per mole of said trichlorosilane in a liquid reaction medium which is predominantly toluene such that triethylamine alane and sodium chloride are produced.

35. A process which comprises reacting
a. an alkali metal aluminum tetrahydride,
b. a silicon compound of the formula $SiH_{4-n}Cl_n$, where n is 1, 2, or 3, and
c. a complexing tertiary amine, in molar proportion a:b:c of about n:1:n, said process being conducted in a liquid reaction medium in the presence of a phase transfer catalyst such that silane and tertiary amine alane are produced.

36. A process of claim 35 wherein said phase transfer catalyst is a tris(polyalkoxyalkyl)amine.

37. A process of claim 36 wherein said phase transfer catalyst is tris[2-(2-methoxyethoxy)ethyl]amine.

38. A process of claim 35 wherein said alkali metal aluminum tetrahydride is sodium aluminum tetrahydride.

39. A process of claim 35 wherein said silicon compound is trichlorosilane.

40. A process of claim 35 wherein said amine is triethylamine.

41. A process of claim 35 which comprises reacting sodium aluminum tetrahydride, trichlorosilane, and triethylamine in a mole proportion of about 3:1:3, in the presence of a reaction-promoting quantity of tris[2-(2-methoxyethoxy)ethyl]amine, such that silane and triethylamine alane are produced.

42. A process for the preparation of silane and aluminum trifluoride, said process comprising
1. conducting the process of claim 1 and recovering silane and a residual reaction mixture containing metal halide and amine alane co-products, separating said metal halide co-product therefrom, thereby producing said amine alane in a mixture free of said metal halide, and
2. reacting silicon tetrafluoride and said amine alane in said mixture free of said metal halide in mole ratio silicon tetrafluoride:amine alane of about 3:4, such that additional silane and aluminum trifluoride are produced.

43. A process of claim 42 wherein step 1 is conducted using sodium aluminum hydride, trichlorosilane, and triethylamine as reactants.

* * * * *

UNITED STATES PATENT AND TRADEMARK OFFICE
CERTIFICATE OF CORRECTION

PATENT NO. : 4,927,616

DATED : May 22, 1990

INVENTOR(S) : Everett M. Marlett

It is certified that error appears in the above-identified patent and that said Letters Patent is hereby corrected as shown below:

Column 13, line 2 reads "amine reaction" and should read -- amine reaction medium. --

Signed and Sealed this

Twenty-eighth Day of January, 1992

Attest:

HARRY F. MANBECK, JR.

*Attesting Officer*  *Commissioner of Patents and Trademarks*